Sept. 13, 1960
A. J. HILDENBRANDT, JR
2,952,502
TRANSMITTING APPARATUS
Filed April 17, 1956
3 Sheets-Sheet 1
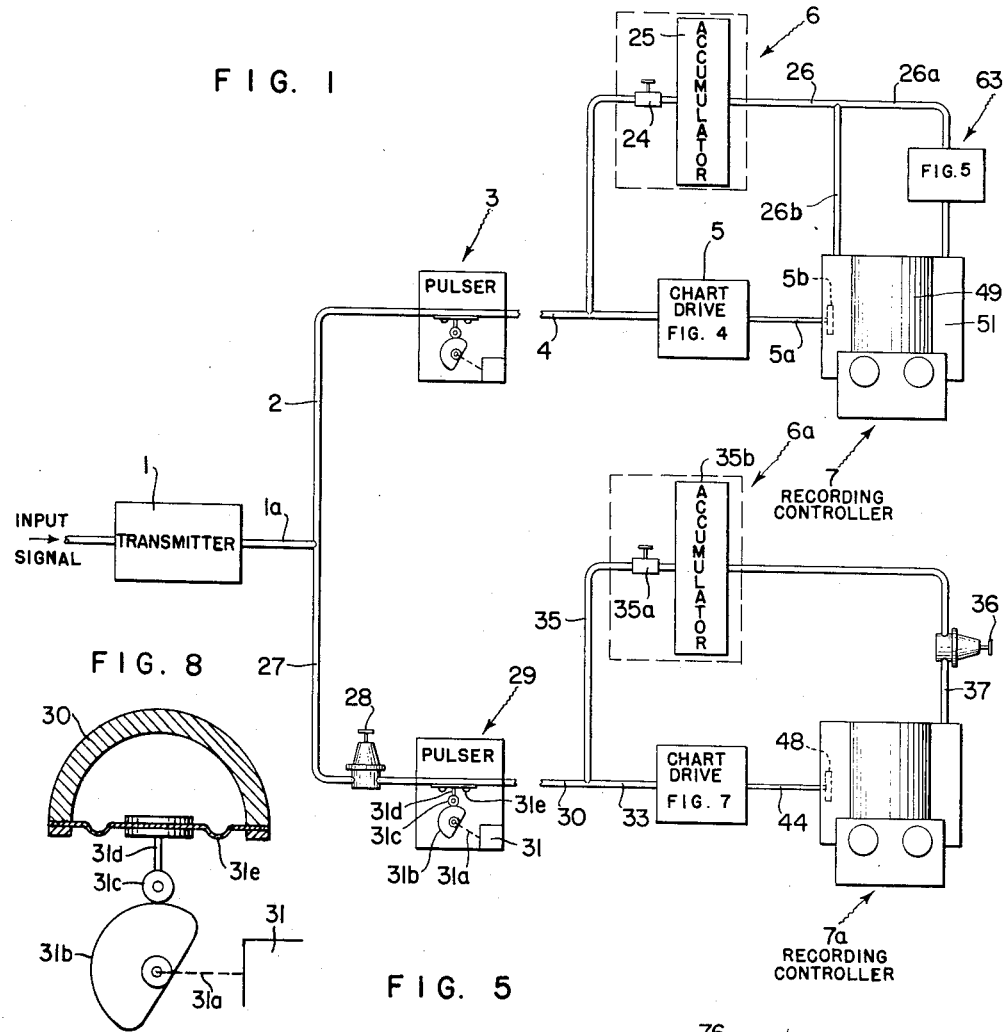
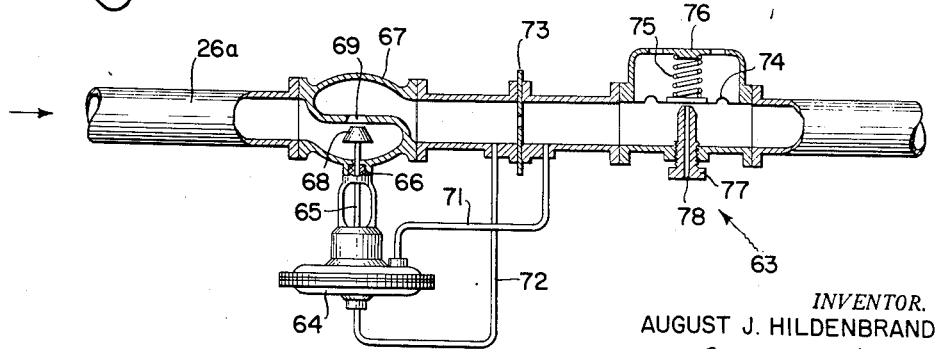
INVENTOR.
AUGUST J. HILDENBRANDT JR.
BY Arthur H. Swanson
ATTORNEY.

Sept. 13, 1960  A. J. HILDENBRANDT, JR  2,952,502
TRANSMITTING APPARATUS
Filed April 17, 1956  3 Sheets-Sheet 2

INVENTOR.
AUGUST J. HILDENBRANDT JR
BY *Arthur H. Swanson*
ATTORNEY.

Sept. 13, 1960 A. J. HILDENBRANDT, JR 2,952,502
TRANSMITTING APPARATUS
Filed April 17, 1956 3 Sheets-Sheet 3

INVENTOR.
AUGUST J. HILDENBRANDT JR.
BY
Arthur H. Swanson
ATTORNEY.

United States Patent Office 2,952,502
Patented Sept. 13, 1960

2,952,502

TRANSMITTING APPARATUS

August Joseph Hildenbrandt, Jr., Elizabeth, N.J., assignor to Minneapolis-Honeywell Regulator Company, Minneapolis, Minn., a corporation of Delaware Filed Apr. 17, 1956, Ser. No. 578,681

13 Claims. (Cl. 346—33)

A general object of the present invention is to provide telemetering apparatus of the fluid pressure operated type in which the number of fluid pressure transmitting connections needed to transmit variable signal, instrument chart driving, and/or instrument operating fluid pressures from a first location to a second and remote location have been reduced to a minimum. In a preferred embodiment of my invention the instrument chart driving fluid pressure and the variable signal fluid pressure whose magnitude is representative of the variable factor under measurement, may be transmitted over a single transmitting connection to a remotely located receiving instrument. Alternately, the instrument chart driving and instrument operating fluid supply pressures which are at regulated constant pressures may be transmitted over a single connection to the remote receiver.

A more specific object of the invention is to join both forms of the aforementioned telemetering apparatus to a common output pressure line of a transmitter or to a signal generating means.

In its more specific aspects, this invention relates to two fluid pulse transmitting systems which may each be operated independently of one another or jointly connected to form a single system.

In a specific embodiment, a single pulse is introduced into a supply fluid at its entrance to a transmission line that is connected to a remotely located recording controller where it is used to drive the recorder chart, and also to supply a substantially constant operating fluid pressure to a recording-controller.

In another embodiment a pulse is introduced into a fluid pressure having a slowly varying pressure characteristic which may be representative of a variable factor being measured and controlled. The fluid pressure is transmitted through a transmission line to a remote recording-controller where the slowly varying pressure pulse is used simultaneously to drive a chart and to supply a constant flow of fluid as well as a correspondingly lower varying fluid pressure signal to a pneumatic controlling instrument.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 is a diagrammatical illustration of the invention in block diagram form;

Fig. 5 illustrates in more detail another portion of the apparatus shown in Fig. 1;

Fig. 8 shows a sectional view of each of the pulsers shown in Fig. 1 of the drawing.

Figure 3:
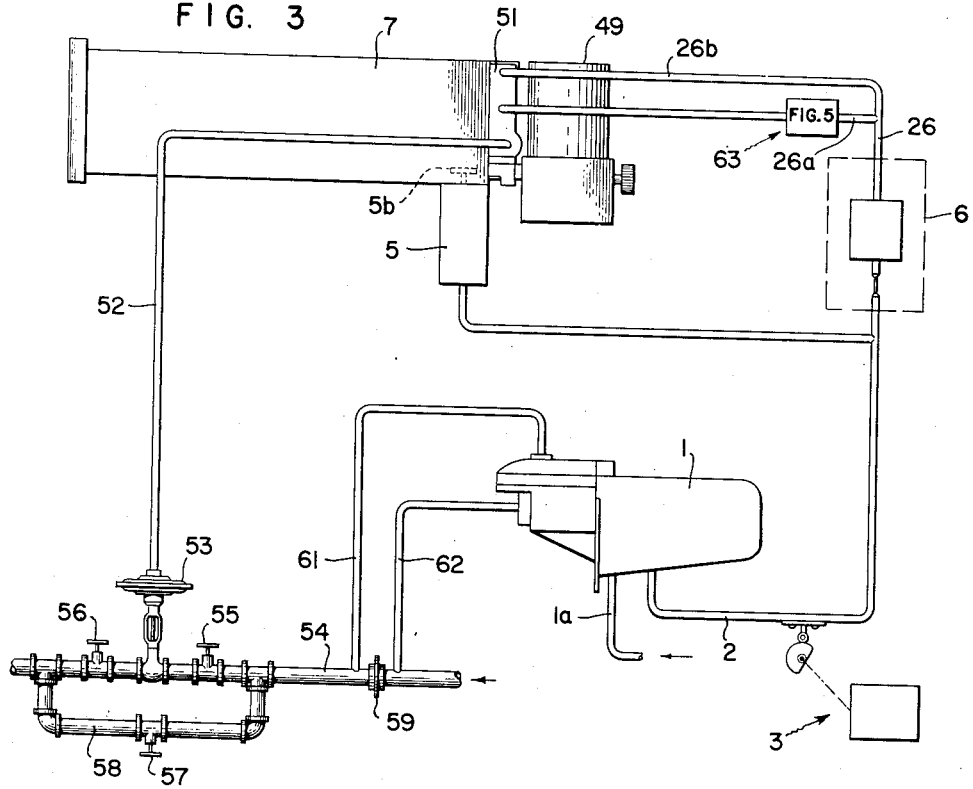
Fig. 3 illustrates one specific apparatus for transmitting the type of signal shown in Fig. 2.

Fig. 1 schematically illustrates an embodiment of my invention including a pneumatic transmitter or fluid pressure generator 1 such as is disclosed in the Stokes et al. patent application Serial No. 347,812, filed April 9, 1953, now U.S. Patent No. 2,823,688, operative to transmit a slowly varying pressure in conduits 1a and 2 to a pulser 3 which may be a synchronous motor or mechanical clock actuated pulser. This pulser is operative to maintain a pulsed air pressure output in a conduit 4. This pulsed variable pressure output in a conduit 4 is transmitted to separate element 5 and pulse filter 6. The element 5 is a differentially actuated air motor which may be, and is assumed to be of the type and form shown in Fig. 4, and regulates or modifies pressure transmitted to rotatable drive shaft 5a. The element 5 shown diagrammatically in Fig. 1, and in more detail in Fig. 4, comprises a pair of aligned bellows elements 8 and 9 having their remote ends extending between and connected to the parallel end portions 10 and 11 of a stationary yoke member 12. The inner ends of the juxtaposed, movable bellows elements 8 and 9 are connected by a thrust member 13. The latter is coaxial with and connects the movable ends of said bellows elements so that the contraction and expansion of each bellows element is necessarily attended by the respective expansion and contraction of the other bellows element. The fluid pressure in the conduit 4 is transmitted directly to the interior of the bellows element 8, and is also transmitted to the interior of the bellows element 9 through a conduit 14 which includes a restriction 15.

Figure 4:
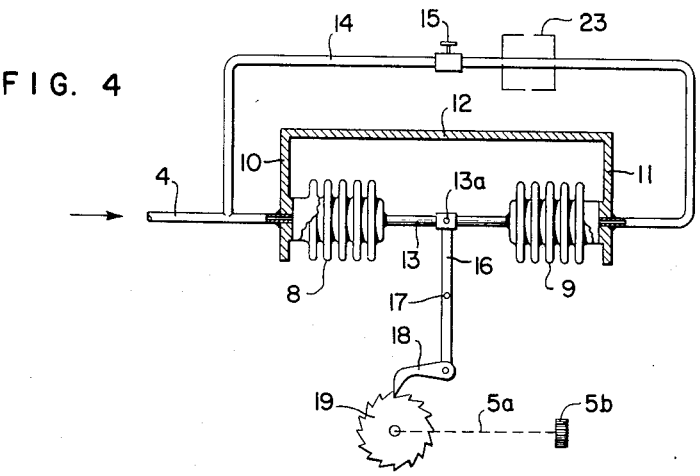
Fig. 4 illustrates in more detail the chart drive apparatus shown in Fig. 1.

The thrust member 13 is pivotally connected intermediate its ends by pin 13a to one end of a transverse lever 16 which turns about a pivot 17. As shown, the end of the lever 16 remote from the thrust member 13 is connected to a pawl 18. The latter is adapted to operatively engage the teeth of a ratchet wheel 19 and rotate the latter in the counter-clockwise direction, as seen in Fig. 4, when the pressure in the bellows 8 increases relative to the pressure in the bellows 9. Clockwise movement of the lever 16 about the pivot 17 thus rotates the ratchet wheel 19 in the counter-clockwise direction. When the pressure in the chamber 8 falls below the pressure in the chamber 9, the thrust member 13 moves to the left, the bellows 8 contracts, and the bellows 9 expands. The expansion of the bellows 9 results in a movement of the pawl 18 in the clockwise direction over one or more of the teeth of the ratchet wheel 19 without rotative movement of the latter. The ratchet wheel 19 is again given movement in the counter-clockwise direction when the bellows 9 is again contracted.

The system shown in Fig. 1 may be modified in form and in respect to its normal operating means. This system is well adapted to transmit a slowly varying pressure, such, for example, as the slowly varying pressure produced when a thermal bulb is used to measure a temperature or as the slowly varying pressure produced by a flow meter 1 shown in Fig. 3. This meter could be of a pressure signal transmitting type such as is shown in the Booth et al. patent application Serial No. 248,358, filed September 26, 1951, now U.S. Patent No. 2,808,724. In such an operation, the fluid pressures maintained in the differentially actuated air motor 5 and pulse filter 6 of Fig. 1 will ordinarily increase during some periods and decrease during other periods. During such an operation the rotative movements of the rotatable shaft 5a fixedly attached to ratchet 19 may be used to transmit rotary motion to a chart driving pinion 5b which is located in the recorder 7. This recorder may be of the type disclosed in the George Robert Brown patent application Serial No. 511,489, filed May 27, 1955, now U.S. Patent No. 2,911,990.

In certain forms of the invention shown in Fig. 4 of the drawing it may be desirable to have some form of damping of the pulsed pressure passing through the conduit 14 to the bellows 9. To this end I have shown in dotted line form an accumulator or equalizer 23 through which fluid may flow into and out of the chamber 9.

In the apparatus shown in Fig. 1 a fluid is passed from the conduit 4 through a pulse filter element 6, which comprises a restriction 24 that can be adjusted to a desired fixed adjustment, and an accumulator 25. The latter has a fluid outlet 26 which may be used to pass air to the air supply chamber (not shown) of a conventional pneumatic controller 49 such as is disclosed in the Brown application noted supra, through a branch 26a of conduit 26, and/or through the conduit 26b of conduit 26 to a process variable chamber of this same controller. This resistance offered by restriction 24 and the large volume of the interior of accumulator 25 is adapted to prevent any undesirable pressure pulsations in conduit 4 from being transmitted to the pneumatic controller 49 without affecting the magnitude of the pressure signal that is being transmitted by the fluid pressure transmitter or generator 1. The accumulator 25 of Fig. 1 is also well adapted for use as a regulator of the general character required to maintain a controlled air supply. This accumulator may also be used in conjunction with a constant flow regulating apparatus shown in Fig. 5 to maintain a desirable constant flow of instrument air to the aforementioned controller. In particular, the accumulator may advantageously be used in conjunction with regulator provisions of the general type shown in Fig. 3.

Figure 2:
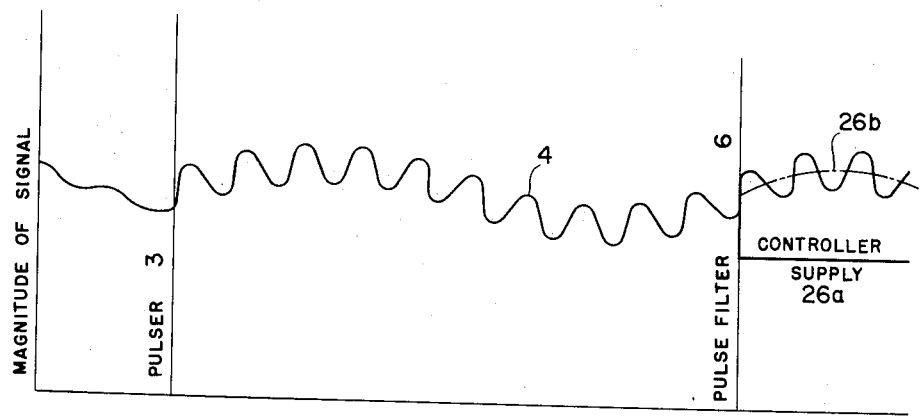
Fig. 2 illustrates the characteristic of one of the systems shown in Fig. 1.

Fig. 2 shows the wave characteristics of a variable pressure signal as it is transmitted from a pneumatic pressure generator such as generator 1 as illustrated in Fig. 1 or Fig. 3 to conduit 26b by way of conduit 2, pulse unit 3, pulse filter 6 to the process variable chamber of a pneumatic recording controller 49. The characteristic of this pressure signal passing through Fig. 2 also shows the pulse filter 6 as it is also transmitting through conduit 26a by way of a pressure regulator Fig. 5 to be hereinafter described, to supply a constant level of controlled air supply to the pneumatic recording 49 controller shown in Fig. 1 and Fig. 3.

Figure 6:
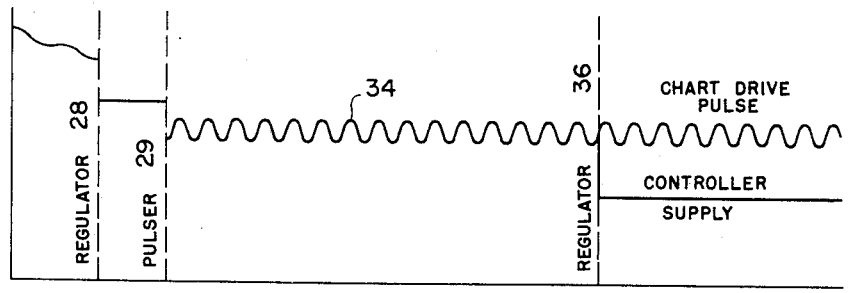
Fig. 6 illustrates the characteristic of the other of the two systems shown in Fig. 1.
Figure 7:
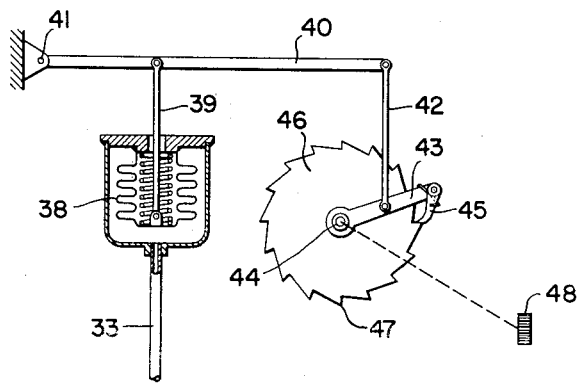
Fig. 7 illustrates in more detail a portion of the apparatus which is used in the other of the two systems shown in Fig. 1.

Embodiments of my invention, somewhat different from those illustrated in Fig. 3 are shown in Fig. 7 and the lower portion of Fig. 1. The apparatus shown in Fig. 7 and the lower portion of Fig. 1 comprises a synchronous pneumatic chart drive adapted for long distance transmission, and associated apparatus which is shown in Fig. 7. More specifically, the apparatus shown e.g. in Fig. 1 and the signal transmission characteristics therefore as shown in Fig. 6 comprises a variable pressure supply line 27 connected to a regulator 28, a pulser 29, and an associated pulsed line 30. The pulser 29 comprises a synchronous electric motor 31 for rotating a shaft 31a. The end of this shaft 31a has a cam 31b fixedly mounted thereon. Rotation of this cam in this manner is used to effect alternate movement in an up and down direction to a cam actuated roller 31c and a vertical shaft 31d on which this roller is mounted. The upper end of this shaft is attached to the central portion of a diaphragm 31e which forms a part of the wall of conduit 30. A chart drive supply extension 33 of the line 30 operatively connects the pulsed signal 34 (note Fig. 6) in line 30 to the chart drive shown in Fig. 7.

This long distance pulse transmitting line 30 also has a branch 35 that connects the pneumatic pulse signal 34, through means of a resistance 35a, an accumulator 35b, and a regulator 36 to an instrument supply line 37. As noted supra the pulse in the slowly varying pulsed pressure line is also transmitted through a pulse filter 6a, formed by example, by the resistance 35a and accumulator means 35b which may be of the same type as the elements 24, 25 shown in the upper portion of Fig. 1, or be of any other filter type pulsation dampener which can effectively check or dampen out nearly 100% of the pulses in the varying pressure signal before such a signal is transmitted through the conduit 37 leading to e.g. a controller of the recording controller 7a. The described arrangement permits a varying pressure to be lowered by means of a regulator 28 to a steady pressure level, and to then pulse this pressure through a long length transmission line 30 to perform the chart driving and/or instrument supply function noted supra.

The pulsed signal 34 transmitted through the conduits 30, 33 operates a conventional pulsed spring biased bellows 38 to give up and down movements to a regulator element 39 and thereby oscillate a lever 40. The latter is shown as having one end arranged to oscillate about a stationary pivot 41, and having its other end connected by a link 42 to an arm 43. The arm 43 has one end pivoted to oscillate on and about a pivot shaft 44 that is fixedly connected to ratchet wheel 46 and has its other end connected to a spring biased pawl or tongue 45. On each clockwise movement of the arm 43, as seen in Fig. 7, the pawl 45 engages the peripheral teeth 47 of a wheel 46 that is adapted to rotate in the clockwise direction during each period in which the pawl 45 moves downward as the bellows 38 expands. When thereafter the bellows 38 contracts and raises the free end of the element 43, the pawl 45 is moved upward. During this upward and downward action of the pawl 45 acting on ratchet wheel 46, the shaft 44 that is fixedly attached to the ratchet wheel 46 will be rotated at a uniform rate of speed in a clockwise direction. In consequence, a chart driving pinion 48 that is fixedly attached to one end of the shaft 44 will be driven in this same clockwise direction, as seen in Fig. 7 and the lower portion of Fig. 1.

As will be apparent, the signal transmitting characteristics shown in Fig. 2 discloses the culmination of some of the signal transmitting ideas already made apparent in Fig. 6. The apparatus disclosed in both of said figures is adapted to transmit a slowly varying pressure, such, for example, as the slowly varying pressure characteristic of a thermal bulb used to measure a temperature or a slowly varying characteristic of a flow of fluid passing through a flow line as is shown in Fig. 3.

As can also be seen by the showing in the upper portion of Figure 1, the branch 26b of the conduit 26 is used to transmit the non-pulse signal to a controller 49. As can be seen in more detail in Figure 3 of the drawing, this controller 49 may be of a well known stack type. Fig. 3 also shows such a controller as having a manifold valve 51 intricately connected thereto.

Briefly, a well known function of this controller is to send out a regulated pressure signal through the conduit 52 to the head of a control valve 53 which will, for example, maintain the flow of a fluid passing through a feed line 54 at a fixed value. This flow line might also, if desired, contain a conventional bypass comprising the valves 55, 56, 57, and the U-shaped pipe 58.

As the flow of fluid passes through the pipes from right to left it will pass through an orifice 59. On either side of this orifice 59 there is shown a pneumatic connection 61, 62 opening into the inner portion of conduit 54. These conduits 61, 62 are in turn shown connected in a conventional manner to a differential pressure measuring apparatus 1. This differential pressure measuring instrument in turn as previously mentioned, under the description of Fig. 1, sends out a signal through the conduit 2 which is proportional to some variable which in this Fig. 3 instance is the flow occurring in the conduit 54. As previously mentioned, it is one of the objects of the invention to pulse such a pressure signal by means of a pulser unit 3. This pulser unit may be of the same motor driven cam actuated diaphragm type of pulser 29 which was previously described in detail under the description of the system shown in the lower portion of Fig. 1 which possesses the signal transmitting characteristics as shown in Fig. 6.

After the slowly varying output signal of the differential pressure measuring apparatus 1 as shown in Fig. 3 has been pulsed by the pulsing unit 3, it is then transmitted through a long length of the tubing 2 to a pulse dampening means 6. As previously described, this means 6 acts to remove the pulse initiated by the pulse unit 3 from the signal being transmitted by the differential pressure measuring apparatus 1. This signal is then transmitted to the conduit 26, 26b to a process variable chamber of the controller 49. As changes in the magnitude of this latter signal occur, the controller will effect the change in signal being transmitted to the control valve 53 through the conduit 52. This change in signal will thus act to reposition the valve 53 in such a position that the fluid flow through same will be kept at a fixed level regardless of any change taking place in the flow of fluid occurring in the right end of the conduit 54 as shown in Fig. 3.

Fig. 3 and the upper portion of Fig. 1 also show another branch 26a of the conduit 26 being used to transmit the signal from the differential pressure measuring apparatus 1 to a constant flow regulating apparatus 63. This regulating apparatus 63 is shown schematically in Fig. 5 of the drawing and comprises a differential pressure actuated diaphragm valve 64 having a stem 65. This stem 65 is slidably mounted by a suitable fluid tight material 66 in a protruded wall portion 67 of the conduit 26a. The lower end of this stem 65 is schematically shown with a plug 68 which is moved relative to a tapered portion 69 forming a fixed opening in the wall of the conduit 26a. On either side of the differential pressure actuated diaphragm valve 64 there is shown a pressure connection 71, 72. These pressure connections are opened respectively into the conduit 26a at positions that are on the right and left sides of an orifice 73. To the right of this orifice is shown another part of the pressure regulating unit. This latter part comprises a diaphragm 74 fixedly attached to and forming an inner wall portion of the conduit 26a. On top and acting in a downward direction on the diaphragm 26a there is shown a biasing means which might well be a coil spring 75. The other end of the coil spring is shown in surface engagement with a protruding portion 76 of the conduit 26a. Immediately below the diaphragm 74, there is shown a nozzle shaped portion 77 having an atmospheric exhaust vent 78 in its central portion and shown as being an integral part of the conduit 26a.

As the signal from the differential pressure measuring instrument passes through the conduit in a left to right direction as indicated by the arrow in Fig. 5, it will pass between the opening between 68, 69, flow through the orifice 73 around the normally slightly open vent 77 of a pressure regulator, and thence to the controlling instrument 49.

Should the magnitude at which the fluid is flowing through the conduit 26a be increased for any reason as it passes through the orifice 73, a self corrective action will be effected by allowing the fluid pressure to be transmitted through the conduits 71, 72 to either side of the diaphragm actuated valve 64. When this occurs, the stem 65 and plug 68 will be forced towards its seat 69 and the surge will be prevented from affecting a steady air supply being delivered to the controller 49.

Also assisting this flow regulating apparatus to maintain this constant flow of supply fluid to the controller at a constant pressure level is the pressure regulator 75—78. The diaphragm of this regulator, as can be seen in Fig. 5, is shown as being slightly spaced from the top of the exhaust nozzle 77 to assure a slight exhaust to atmosphere. Should the pressure level of the aforementioned fluid in conduit 26a increase as it passes the exhaust nozzle 77 the diaphragm 74 and spring 75 acting on the diaphragm will be compressed in an upward direction permitting a greater amount of fluid to be exhausted through the vent 78. Should, on the other hand, the pressure level of the fluid flowing through this line drop to a lower level the bias of the spring 75 will act in a downward direction to close off the vent 78 and thus momentarily prevent fluid from exhausting through same until the pressure level of this fluid is again brought back toward its normal level. As this latter action takes place the pressure of the fluid in conduit 26a will cause the diaphragm to be forced upwardly against the bias of the coil spring 75.

It was previously mentioned that one of the objects of the present invention was to connect a pulse transmitting system which will produce a signal transmitting characteristic as shown in Fig. 2 with a type of transmitting system which will produce a signal transmitting characteristic as that shown in Fig. 6. This joint system is shown in Fig. 1 of the drawings. In this latter figure a branch 27 of the conduit 30 of the lower transmitting system shown in this figure is joined to the output pressure line 1a of a transmitting or fluid pressure generating means 1. This figure also shows how the branch 2 of the conduit 4 of the upper transmitting system shown in this figure can also be joined to the same output pressure line 1a of the transmitter or other variable fluid pressure generating means 1.

The present invention thus provides a way of minimizing the number of transmission lines in each system that are necessary to safely transmit chart driving, supply and pressure controlling signals to a plurality of remotely located recording controllers.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. A pressure transmitting system, comprising a transmitter to transmit a fluid under a variable pressure through a transmission conduit, said transmitter being operably connected to one end of said conduit, a pulser operably connected adjacent to said one end of said conduit to pulse the fluid passing therethrough, a pair of conduits branching off said other end of said transmission conduit, a pulse filter positioned in one of said pair of conduits operably connected therewith to remove said pulse from said fluid passing therethrough, a differentially actuated fluid motor positioned in the other of said pair of conduits and said motor being operably connected with said pulsed fluid in said last mentioned conduit to produce rotary mechanical motion as said pulsed fluid is applied thereto.

2. An apparatus as specified in claim 1 in which said pulser is a power actuated element.

3. Apparatus as specified in claim 1 in which said pulser comprises a motor driven cam and roller means, a diaphragm forming a wall portion of said transmission conduit through which said fluid under a variable pressure is being transmitted, and wherein said cam is operably connected with said diaphragm to cause said diaphragm to be intermittently depressed.

4. A transmitting apparatus, comprising a transmitter, a single transmitting conduit, one of the ends of said single conduit being connected to said transmitter and its other end connected and opening into one end of a first and second branch conduit, said transmitter being operably connected to transmit a fluid under a slowly varying pressure through said single conduit and said first and second branch conduits, a pulser operably positioned adjacent said transmitter to pulse said fluid being transmitted through said single transmitting conduit, a filter positioned in said first branch conduit at an end location that is distant from said transmitter to substantially remove said pulse from said fluid passing therethrough, said other end of said first branch conduit being connected to a fluid pressure actuated controller providing a passageway through which said substantially non-pulsed fluid pressure in said first branch conduit can be applied to said controller, a constant flow regulating apparatus in said second branch conduit to maintain a constant flow of said fluid passing therefrom, said other end of said second branch conduit being connected to said controller to transmit said constant flow of fluid thereto as a supply pressure, said other end of said single transmitting conduit having a third branch conduit connected thereto and said remaining end of said third branch conduit having a differentially actuated fluid motor connected therewith to simultaneously actuate a chart drive while said non-pulsed fluid in said first and second branch conduit is applied to said controller.

5. Apparatus as specified in claim 1 in which the pulsed fluid pressure output is passed partly by said one of said conduit branches to said differentially actuated fluid motor and partly by the other of said conduit branches to said pulse filter.

6. Apparatus as specified in claim 1 in which said pulser is a power actuated element and said pulse filter is operably connected to transmit substantially pulse-free pressure by way of said one of said conduits to a pressure actuated controller.

7. Apparatus as specified in claim 1 wherein said transmission conduit is a single long length conduit that is employed to transmit fluid under pressure from said pulser to said pulse filter by way of said one of said pair of branch conduits, said pulse filter being comprised of a means to remove the major portions at least of the pulse from the fluid passing therethrough and another portion of said one of said pair of branch conduits being operably connected to said filter to transmit said last mentioned fluid to a pressure actuated controller that is responsive thereto.

8. In a transmitting system having a pneumatic signal generating transmitter, the combination comprising, a single transmitting conduit having one end connected to said transmitter for transporting said generator pneumatic signal to a remote location away from said transmitter, a synchronized pulser element connected to a portion between the ends of said conduit to pulse said pneumatic signal being transmitted through said conduit, a first and second branch conduit each having one end connected to the other end of said transmitting conduit to respectively transmit said pulsed pneumatic signal from said synchronized pulser element partly to a differentially actuated fluid motor located in one of said branch conduits and simultaneously through a pulse filter positioned in the other of said branch conduits, said pulse filter being operable to remove the pulse from said pneumatic signal being transmitted therethrough and said last-mentioned branch conduit being operably connected at its other end to a receiving instrument to enable said non-pulsed pneumatic signal from said pulse filter to pass by way of said last-mentioned conduit to said receiving instrument while said pulsed pneumatic signal is applied to said fluid motor.

9. A combination as specified in claim 8, wherein said fluid motor comprises a yoke member having side by side spaced apart arms, a pair of aligned bellows elements having adjacent ends rigidly connected to one another and having opposite ends connected to the adjacent sides of said arms, conduit connections between each of said elements and said pulser, means restricting flow in said connection between the remote ends of the two bellows elements, and means connected to the adjacent movable ends of the two bellows elements for regulating the motor output in response to variations in the relative pressures of the two bellows.

10. Apparatus to transfer a fluid pressure signal of varying magnitude from a fluid pressure signal generating means having an output port to a remotely located input port of a recording controller, comprising a fluid pressure signal transmitting conduit operably connected at one of its ends to the output fluid pressure signal port of said varying signal generating means and at its other end by way of a first branch conduit to the input port of a recording controller, a deflectable diaphragm connected to and forming a part of the wall of said transmitting conduit adjacent said signal generating means, a continuously rotating constant speed cam means operably connected to said deflectable diaphragm for intermittently deflecting same into an inner wall portion of said conduit, a pulse filter positioned in said first branch conduit adjacent said recording controller to eliminate the pulse introduced into said fluid pressure of varying magnitude before said signal is sent through said input port to said recording controller as an input varying fluid pressure signal and said other end of said transmitting conduit having a second branched conduit connected thereto through which the pulsed fluid pressure passing therethrough is applied to a pulse actuated means while said non-pulsed signal is being simultaneously applied through said input port to said recording controller.

11. A pressure signal telemetering apparatus, comprising a conduit, a fluid pressure signal generating means operably connected to one of the open ends of said conduit to generate a slowly varying fluid pressure signal of varying magnitude in said conduit, a mechanically operated means positioned adjacent said generating means and operably connected to said conduit to pulse the said generated fluid pressure signal, a recording controller means operably connected by way of a first branch conduit to the other end of said transmitting conduit to effect a recording and controlling action that is in accordance with the magnitude of said generated signal, a pulse filter positioned in said first branch conduit adjacent said recording controller means to eliminate the pulse introduced into said fluid pressure of varying magnitude as said signal is sent through said first branch conduit to said controller as an input varying fluid pressure signal and said other end of said transmitting conduit having a second branch conduit connected thereto through which said pulsed pressure signal passing therethrough is applied to a pulse actuated means while said non-pulsed signal is being simultaneously applied through said input port to said recording controller means.

12. A pressure signal telemetering apparatus comprising, a fluid pressure signal transmitting conduit, a fluid pressure signal generating means operably connected to one of the open ends of said conduit to generate a fluid pressure signal of slowly varying magnitude in said conduit, a mechanically operated means located adjacent said generating means to pulse said signal, a chart driving means operably connected to said pulse signal by way of a first conduit branch extending from the the other end of said transmitting conduit, a second conduit branch extending from said other end of said transmitting conduit to a controlling recorder, a pulse filter operably positioned within said second conduit to substantially eliminate the pulse in said fluid pressure signal passing therethrough and a pressure regulator positioned in said second conduit between said pulse filter and said controller recorder to reduce the pressure level of said nonpulsed pressure signal that has passed through said pulse filter before said last mentioned signal is transmitted to said controlling recorder as a supply pressure of constant magnitude.

13. A pressure signal telemetering apparatus comprising, a fluid pressure signal transmitting conduit, a fluid pressure signal generating means operably connected to one of the open ends of said conduit to generate a fluid pressure signal of slowly varying magnitude in said conduit, a mechanically operated means located adjacent said generating means and operably connected to a diaphragm joining a wall portion of said conduit to pulse said signal, a chart driving mechanism operably connected to a branch conduit extending from the other end of said conduit, a second branch conduit portion extending from the other end of said first mentioned conduit and a pulse filter and a constant flow regulating apparatus operably connected in series in said second branch conduit to respectively eliminate the pulse from said pressure signal and to reduce the pressure of the resulting unpulsed fluid pressure signal to a fixed pressure level and said constant flow regulating apparatus being operably connected to a receiving instrument to enable said fluid pressure at a fixed pressure level to be transmitted to said receiving instrument.

References Cited in the file of this patent

UNITED STATES PATENTS

| | | |
|---|---|---|
| 1,889,089 | De Giers | Nov. 29, 1932 |
| 2,405,100 | Stephens | July 30, 1946 |
| 2,491,361 | Burdick | Dec. 13, 1949 |
| 2,736,629 | Smith | Feb. 28, 1956 |

FOREIGN PATENTS

| | | |
|---|---|---|
| 311,266 | Switzerland | Jan. 31, 1956 |